(12) United States Patent
Raftery

(10) Patent No.: US 8,093,736 B2
(45) Date of Patent: Jan. 10, 2012

(54) WAVE ENERGY HARNESSING DEVICE

(75) Inventor: Michael William Raftery, Hawley, PA (US)

(73) Assignee: The Trustees of The Stevens Institute of Technology, Hoboken, NJ (US)

( * ) Notice: Subject to any disclaimer, the term of this patent is extended or adjusted under 35 U.S.C. 154(b) by 375 days.

(21) Appl. No.: 12/397,871

(22) Filed: Mar. 4, 2009

(65) Prior Publication Data

US 2010/0025993 A1  Feb. 4, 2010

Related U.S. Application Data

(63) Continuation-in-part of application No. 12/042,845, filed on Mar. 5, 2008, now abandoned.

(60) Provisional application No. 61/033,930, filed on Mar. 5, 2008, provisional application No. 60/906,148, filed on Mar. 9, 2007.

(51) Int. Cl.
*F03B 13/10* (2006.01)
*H02P 9/04* (2006.01)

(52) U.S. Cl. ............................................ 290/42; 290/53
(58) Field of Classification Search ................. 290/42, 290/53; 60/498, 501, 495, 496, 497, 502, 60/504, 505; 417/417
See application file for complete search history.

(56) References Cited

U.S. PATENT DOCUMENTS

| | | | |
|---|---|---|---|
| 416,972 A | 12/1889 | Thomas | |
| 450,434 A | 4/1891 | Thomas | |
| 597,832 A | 1/1898 | Palmer | |
| 597,833 A | 1/1898 | Palmer | |
| 631,994 A | 8/1899 | Montague | |
| 646,199 A | 3/1900 | Walker | |
| 657,355 A | 9/1900 | Nagler | |
| 1,036,502 A | 8/1912 | Marsden | |
| 1,105,249 A | 7/1914 | Bustos | |
| 1,358,259 A | 11/1920 | Stein | |
| 1,523,031 A | 1/1925 | Mitchell et al. | |
| 2,871,790 A | 2/1959 | Weills | |
| 3,047,207 A | 6/1962 | Baldwin et al. | |
| 3,200,255 A | 8/1965 | Masuda | |
| 3,297,300 A | 1/1967 | Mountanos | |
| 3,487,228 A | 12/1969 | Kriegel | |
| 4,103,490 A | 8/1978 | Gorlov | |
| 4,110,630 A | 8/1978 | Hendel | |
| 4,185,464 A | 1/1980 | Rainey | |
| 4,208,877 A * | 6/1980 | Evans et al. ..................... | 60/495 |
| 4,208,878 A | 6/1980 | Rainey | |
| 4,249,084 A | 2/1981 | Villanueva et al. | |
| 4,327,296 A * | 4/1982 | Weyers .......................... | 290/53 |
| 4,398,095 A | 8/1983 | Ono | |
| 4,408,454 A * | 10/1983 | Hagen et al. ................... | 60/500 |

(Continued)

FOREIGN PATENT DOCUMENTS

FR   2479343   10/1981

(Continued)

*Primary Examiner* — Julio Cesar Gonzalez
(74) *Attorney, Agent, or Firm* — Greenberg Traurig, LLP

(57) ABSTRACT

A hydrokinetic device having a water surface float tethered to a submerged buoyant housing is provided with mechanisms for optimizing the amount of wave energy extracted from the waves by the device. Based on wave conditions, the optimization functionalities include controlling the depth of the housing to produce wave shoaling or storm avoidance, as well as to perform continuous phase control and load control for the purpose of matching the response frequency of the device to the frequency of the incident waves.

5 Claims, 13 Drawing Sheets

U.S. PATENT DOCUMENTS

| | | | |
|---|---|---|---|
| 4,425,510 A | 1/1984 | Jury | |
| 4,455,824 A | 6/1984 | Dabringhaus | |
| 4,464,080 A | 8/1984 | Gorlov | |
| 4,490,621 A * | 12/1984 | Watabe et al. | 290/42 |
| 4,599,858 A | 7/1986 | La Stella et al. | |
| 4,603,551 A | 8/1986 | Wood | |
| 4,622,473 A | 11/1986 | Curry | |
| 4,661,716 A * | 4/1987 | Chu | 290/53 |
| 4,698,969 A | 10/1987 | Raichlen et al. | |
| 4,726,188 A | 2/1988 | Woolfolk | |
| 4,739,182 A | 4/1988 | Kenderi | |
| 4,742,241 A | 5/1988 | Melvin | |
| 4,754,157 A | 6/1988 | Windle | |
| 4,773,221 A | 9/1988 | Noren | |
| 4,776,171 A * | 10/1988 | Perry et al. | 60/698 |
| 4,914,915 A | 4/1990 | Linderfelt | |
| 5,176,552 A * | 1/1993 | Kuboyama et al. | 441/16 |
| 5,186,822 A | 2/1993 | Tzong et al. | |
| 5,359,229 A | 10/1994 | Youngblood | |
| 5,499,889 A * | 3/1996 | Yim | 405/76 |
| 6,020,653 A | 2/2000 | Woodbridge et al. | |
| 6,229,225 B1 | 5/2001 | Carroll | |
| 6,291,904 B1 | 9/2001 | Carroll | |
| 6,388,342 B1 | 5/2002 | Vetterick, Sr. et al. | |
| 6,392,314 B1 | 5/2002 | Dick | |
| 6,644,027 B1 * | 11/2003 | Kelly | 60/498 |
| 6,647,716 B2 | 11/2003 | Boyd | |
| 6,765,307 B2 * | 7/2004 | Gerber et al. | 290/42 |
| 6,772,592 B2 | 8/2004 | Gerber et al. | |
| 6,800,954 B1 | 10/2004 | Meano | |
| 6,953,328 B2 | 10/2005 | Welch, Jr. et al. | |
| 7,045,912 B2 | 5/2006 | Leijon et al. | |
| 7,059,123 B2 | 6/2006 | Welch, Jr. et al. | |
| 7,245,041 B1 | 7/2007 | Olson | |
| 7,298,054 B2 | 11/2007 | Hirsch | |
| 7,319,278 B2 | 1/2008 | Gehring | |
| 7,948,107 B2 * | 5/2011 | Fraenkel | 290/54 |
| 2002/0047273 A1 * | 4/2002 | Burns et al. | 290/53 |
| 2005/0121915 A1 | 6/2005 | Leijon et al. | |
| 2007/0040384 A1 | 2/2007 | Bernhoff et al. | |
| 2007/0164568 A1 | 7/2007 | Greenspan et al. | |
| 2007/0228737 A1 | 10/2007 | Hirsch | |
| 2008/0054640 A1 | 3/2008 | Olson | |

FOREIGN PATENT DOCUMENTS

| | | |
|---|---|---|
| WO | WO 00/005501 A1 | 2/2000 |
| WO | WO 02/057623 A1 | 7/2002 |

* cited by examiner

WAVE ENERGY HARNESSING DEVICE

CROSS-REFERENCE TO RELATED APPLICATIONS

The present application claims the benefit of U.S. Provisional Patent Application Ser. No. 61/033,930, filed Mar. 5, 2008, the disclosure of which is incorporated herein by reference in its entirety, and is a continuation-in-part of prior U.S. patent application Ser. No. 12/042,845, filed on Mar. 5, 2008 now abandoned, which claims the benefit of U.S. Provisional Patent Application Ser. No. 60/906,148, filed Mar. 9, 2007, the disclosures of which are incorporated herein by reference in their entirety.

FIELD OF THE INVENTION

The present invention relates to a system for optimizing energy extraction output for hydrokinetic devices, and more particularly, to a system for optimizing energy extraction output for wave energy harnessing devices.

BACKGROUND OF THE INVENTION

The finite supply and environmental issues associated with fossil fuels have resulted in the need for alternate energy sources. The decline in fossil fuel sources, difficulty in obtaining those fossil fuels, and environmental impacts of their use have lead to instability in the energy markets. Over the years, numerous hydrokinetic devices have been proposed for extracting energy from waves (e.g., sea or lake surface waves) to produce electrical energy. The use of sea walls, track and rail systems, pump systems, capture basins, piston driven systems, oscillating water columns, flapper systems, linear magnet systems, wave swings, or floatation elements have been proposed, in combination with other elements, to facilitate the extraction of energy from waves. None of these devices, however, incorporate real time adjustments to the device depth and response frequency in response to real time changes in wave characteristics to optimize the energy extracted from the waves. Therefore, such devices fail to use the full energy provided by the waves resulting, in lost opportunities for electricity production.

SUMMARY OF THE INVENTION

The present invention overcomes the short-comings described above by providing a wave energy harnessing devices having optimized functionality that applies real time adjustments in response to real time changes in wave characteristics, so as to optimize the energy extracted from the waves. The wave energy harnessing device has a surface flotation device with a line attached to a reel positioned on a submerged buoyant-platform, which itself is anchored to the sea floor. The flotation device line is wrapped around the reel. Lift from the floatation device and load from a power take-off system induce reciprocating rotary motion on the reel as waves pass by the flotation device. The lift from the floatation device inputs energy to the power take-off system, causing the reel to rotate in one direction, and the power take-off system acts as a spring to rewind the reel after the wave passes under the floatation device, causing the reel to rotate in the opposite direction. Since more energy is required to lift the floatation device than to rewind the reel, there is a net gain in energy stored in the power take-off system from each wave cycle. The energy gained can be used to operate the electrical generating equipment mounted on the platform. The submerged buoyant platform is maintained in a submerged position by anchors in the sea floor that are attached to winches on the platform. The winches provide means for controlling the depth of the platform below the surface. This variable depth capability of the platform enables a wave shoaling feature and an active storm avoidance feature. For example, in calm and moderate seas, for a coordinated grouping of hydrokinetic devices, the platforms may be raised near the surface to use the buoyant platform to shoal incident waves, thereby increasing the combined wave energy extraction efficiency of the coordinated grouping of hydrokinetic devices. In storms or periods of extremely large waves, the platforms may be lowered near the sea floor where water particle motion is reduced, thereby reducing the kinematic and dynamic loads on the platforms and anchor lines. The variable depth feature is controlled by winches with continuous response to changing anchor line and/or flotation device line tension. This provides a continuous phase control feature which focuses waves and tunes the response of the hydrokinetic device. As a result, the wave energy extraction efficiency of the device is increased. The optimizing functionality also controls loads applied to the reel of the wave energy harnessing device, in accordance with the wave characteristics, so as to maximize energy extracted from the waves.

The wave energy harnessing device converts the energy that fluxes through very large volumes of water such as, but not limited to, oceans, lakes, and rivers into electricity or stored energy. The energy flux may come in the form of swells, wind waves, or currents. The wave energy harnessing device uses the torque applied to the reel by the line under tension as the mechanical energy source. The mechanical energy source is the lift force applied by the floatation device. The reel rotates a pump-motor to force hydraulic fluid through a hydraulic line into an accumulator housing. A fraction of the energy stored in the accumulator will be used to rewind the reel after a wave crest has passed under the floatation device, while the remainder is used to drive a generator to produce electrical energy.

Further features and advantages of the invention will appear more clearly on a reading of the detailed description of an exemplary embodiment of the invention, which is given below by way of example only with reference to the accompanying drawings.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Figure 1:
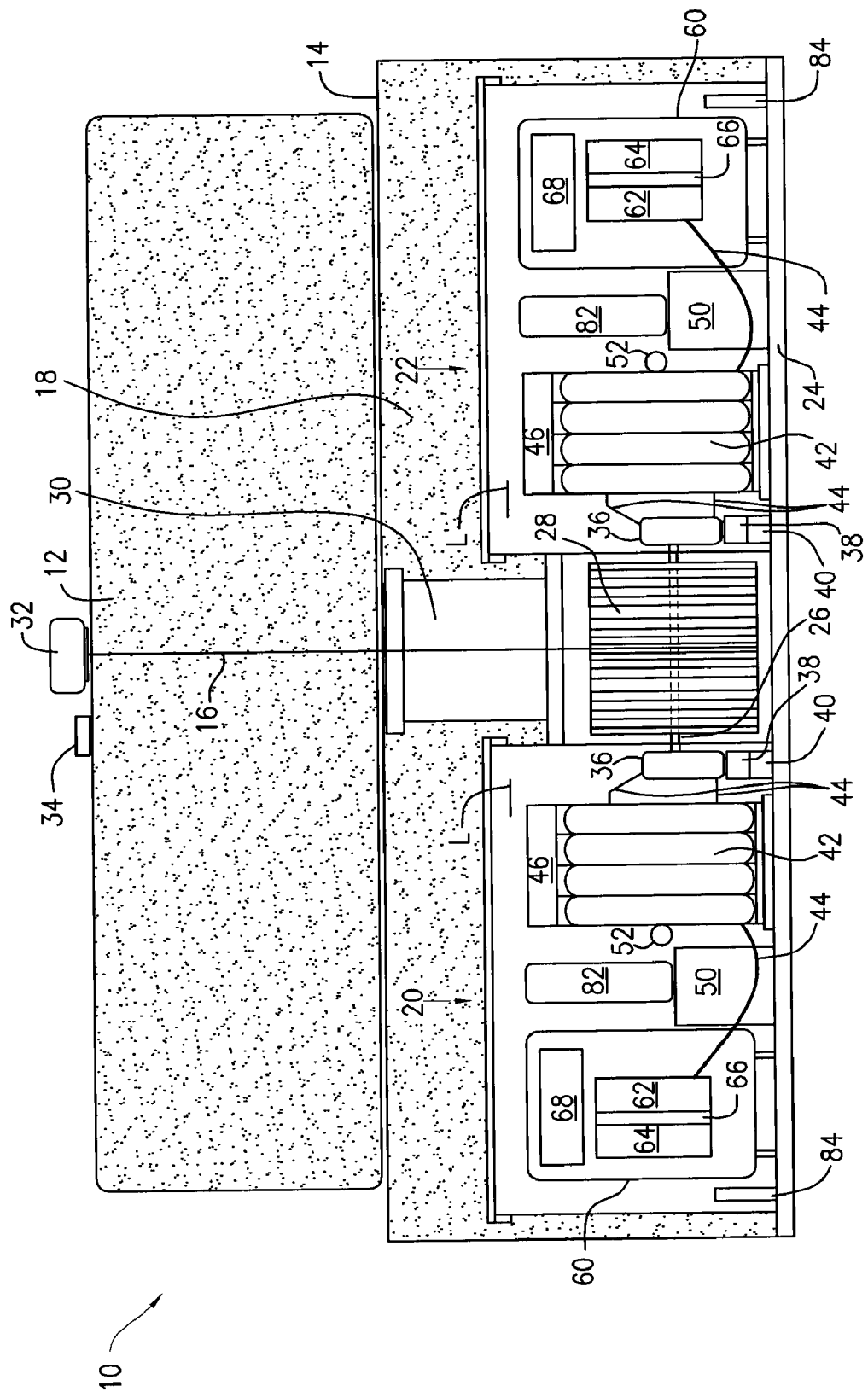
FIG. 1 is a schematic diagram of a wave energy harnessing device constructed in accordance with an exemplary embodiment of the present invention.

FIG. 1 illustrates a wave energy harnessing device (referred to herein as "the device") 10 constructed in accordance with an exemplary embodiment of the present invention. The device 10 is adapted for deployment in a body of water, such as a sea or lake, for the purpose of extracting energy stored in the waves on the surface of the water and converting the extracted energy into electrical energy. The device 10 features novel functionality for optimizing the output of the energy extracted from the waves.

More particularly, the device 10 has a water surface flotation element (i.e., a "float") 12 that is tethered to a housing 14 by a line 16. The float 12 has a foam-filled core with foam or other suitable material, and is cylindrically shaped with a flat top for ease of maintenance, although any other suitable shape may be used. The housing 14 includes a foam filled section 18 which has two fluid-tight compartments 20, 22 that are positioned within at opposite ends of the housing 14 and are secured to a base plate 24. A rigid rod or axel 26 is rotatively positioned transversely between the compartments 20, 22. The opposite ends of the axel 26 extends into compartments 20, 22 through liquid tight bearings (not shown). A drum or reel 28 is fixedly attached to the axel 26 such that the longitudinal axis of the reel 28 is coincident with the longitudinal axis of the axel 26. One end of the line 16 (opposite the float 12) is attached to the reel 28 and is spooled or wrapped around the reel 28 such that when a pulling-force is applied to the line 16, a torque is created on the axel 26 in a first direction, and the line 16 is unspooled or paid-out. Likewise, when a torque is applied from within the compartments 20, 22 to the axel 26 in a direction opposite the first direction, the line 16 is spooled-in or wrapped around the reel 28. The line 16 passes through a reel spooling compartment 30 in the housing 14, and includes a communications wire (not shown) that is integrated in the line 16 for purposes to be discussed hereinafter. One end of the communications wire is attached to a communications package 32 and a motion sensor 34. The communications package 32 is positioned on the top exterior of the float 12, and the motion sensor 34 is positioned on or within the exterior of the float 12. The end of the communications wire opposite the communications package 32 is attached to slip-ring connectors (not shown) that are positioned adjacent to the liquid tight-bearings (also not shown). The communications package 32 supports the exchange (e.g., via satellite, radio, cellular, etc.) of environmental and operational data between the device 10, other devices, and shore based computers and entities, for purposes that are described hereinbelow.

Continuing to refer to FIG. 1, the compartments 20, 22 are filled with oil to levels denoted by marks L. Pump-motors 36 are attached to the ends of the axel 26. Flow control valves 38 are attached to the pump-motors 36 and pressure transducers 40 are attached to the flow control valves 38, which regulate fluid direction and flow rate through the pump-motors 36. The pump-motors 36 have impellers (not shown) that permit the pump-motors 36 to function as either fluid pumps or motors. More particularly, the pump-motors 36 can function as pumps (i.e., the impellers simultaneously draw low pressure fluid from the oil reservoirs into the pump-motors 36 and pump high pressure fluid out of the pump-motor 36) when torque is applied to the impellers by the axel 26. Likewise, the pump-motors 36 can function as motors (i.e., fluid is forced through the pump motors), whereby the impellers 36 exert torque on the axel 26.

Still referring to FIG. 1, the compartments 20, 22 are provided with high-pressure accumulator banks 42 which store energy in the form of compressed gas. Nitrogen gas is utilized although any other suitable gas may be used. The high-pressure accumulator banks 42 can be replaced with capacitors, batteries, or any other suitable energy storage medium. The high-pressure accumulator banks 42 are attached to the pump-motors 36 by hydraulic fluid lines 44. The pump-motors 36, operating in the pump mode, draw low-pressure fluid from pre-charged hydraulic reservoirs 46 and pumps high-pressure fluid to the high-pressure accumulator banks 42 through the hydraulic fluid lines 44. The high-pressure accumulator banks 42 have diaphragms or pistons (not shown) that separate the fluid from the gas. High pressure fluid delivered to the high-pressure accumulator banks 42 compresses the gas in the high-pressure accumulator banks 42. The high pressure gas is also stored in high-pressure rails or manifolds 48 (not shown in FIG. 1, but see FIG. 5), as well as in high-pressure nitrogen banks 50. The pressure in the high-pressure accumulator banks 42 is measured by the pressure transducers 52. Low pressure gas is also stored in low pressure rails or manifolds 54 (see FIG. 5) and low pressure accumulators 56 (see FIG. 5) and is controlled by accumulator regulator control valves 58, 59 (see FIG. 5) for purposes to be discussed hereinbelow.

With continued reference to FIG. 1, the compartments 20, 22 also include nitrogen gas filled vessels 60. More particularly, the vessels 60 contain generator drive motors 62 that are connected to electric generators 64 through hydraulic transmissions 66. The vessels 60 also contain control logic modules (i.e., "the control logics") 68, which include processors and memory, logic, and databases for controlling the functioning of the device 10. High-pressure fluid in the high-pressure accumulators banks 42 is piped to the generator drive motors 62 via sequence valves 70 (not shown in FIG. 1, but see FIG. 5) and flow control valves 72 (see FIG. 5), which draw fluid from reservoirs through drive orifices 74 (see FIG. 5), and is returned to the compartments 20, 22 via a hydraulic motor case drain 76 (see FIG. 5). The nitrogen gas in the vessels 60 is regulated from a high pressure to a low pressure via high-pressure nitrogen inlet valves 78 (see FIG. 5) and low-pressure nitrogen outlet valves 80 (see FIG. 5). The low pressure nitrogen outlet valves 80 are connected to the low pressure manifolds 54.

Still referring to FIG. 1, the compartments 20, 22 are provided with supply pre-charge accumulators 82 that utilize the low pressure gas from the low pressure manifolds 54 to drive low pressure fluid through the pump-motors 36, thereby driving the pump-motors 36 in the motor mode for purposes that are described hereinbelow. The compartments 20, 22 also have anchor winch control valves 84 mounted on the base plate 24, for purposes to be discussed below.

Figure 2:
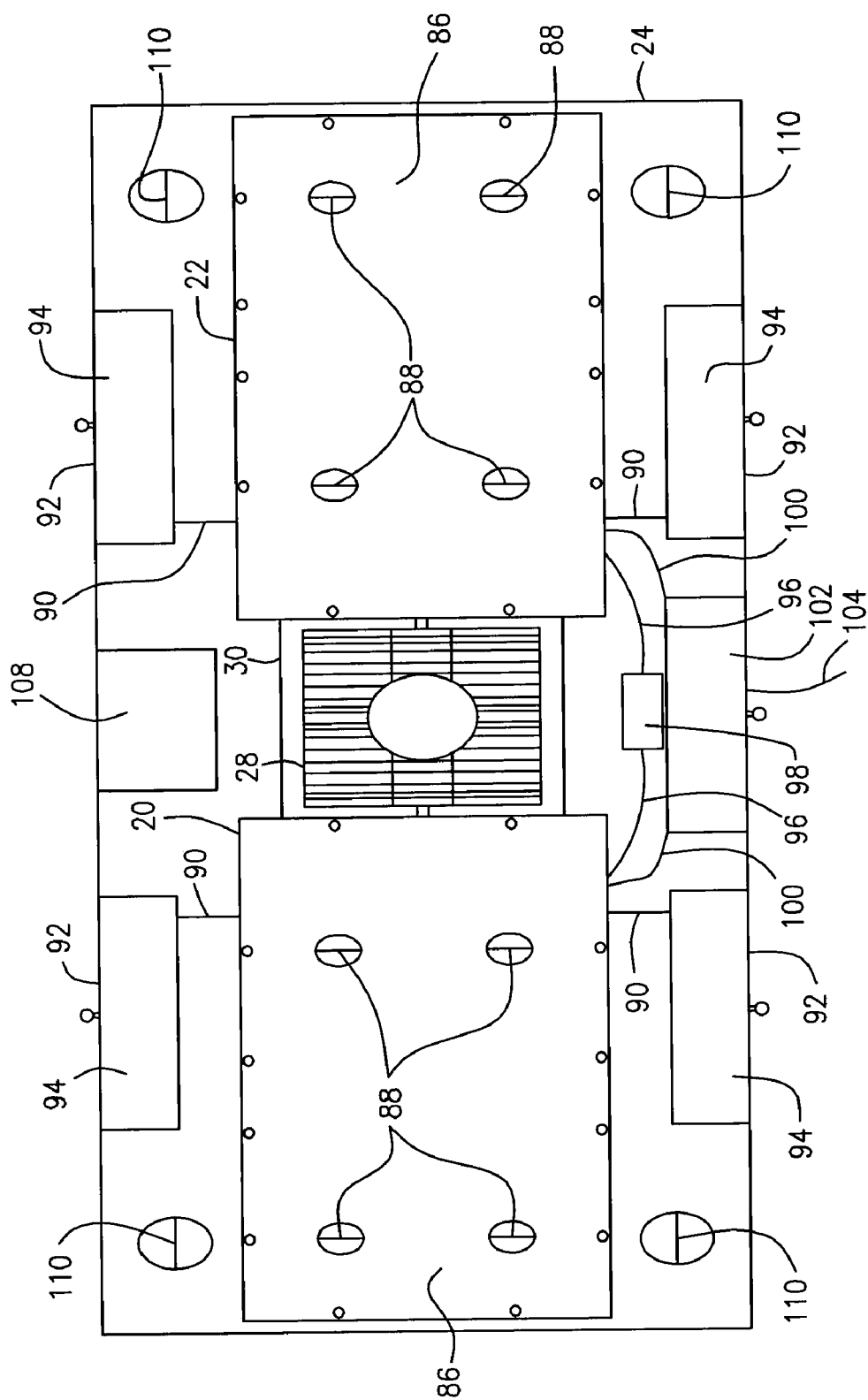
FIG. 2 is a top plan view of the wave energy harnessing device shown in FIG. 1, but with a floatation section being detached from a housing employed by the device.
Figure 3:
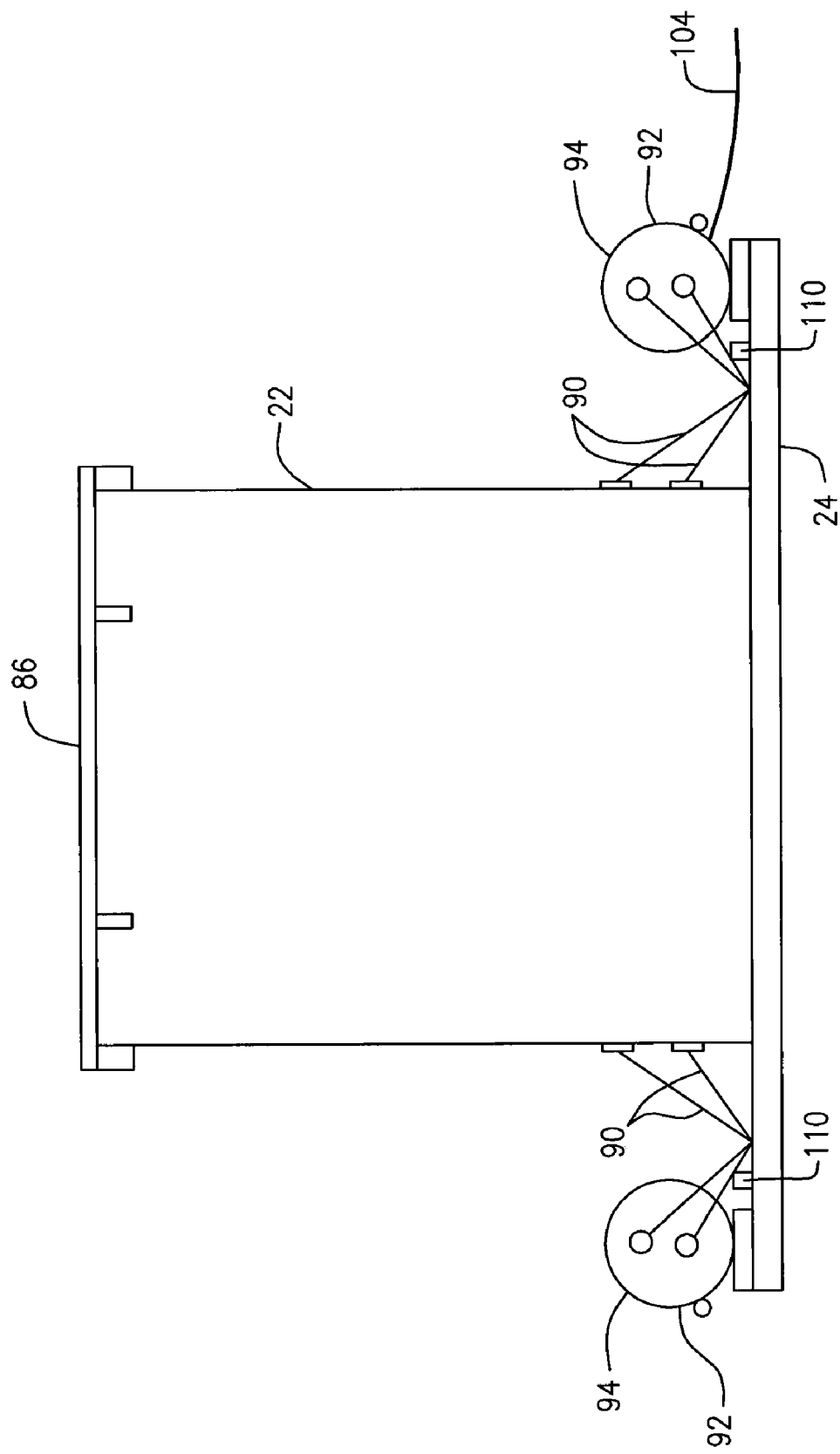
FIG. 3 is a side elevational view of the wave energy harnessing device shown in FIG. 2.
Figure 11:
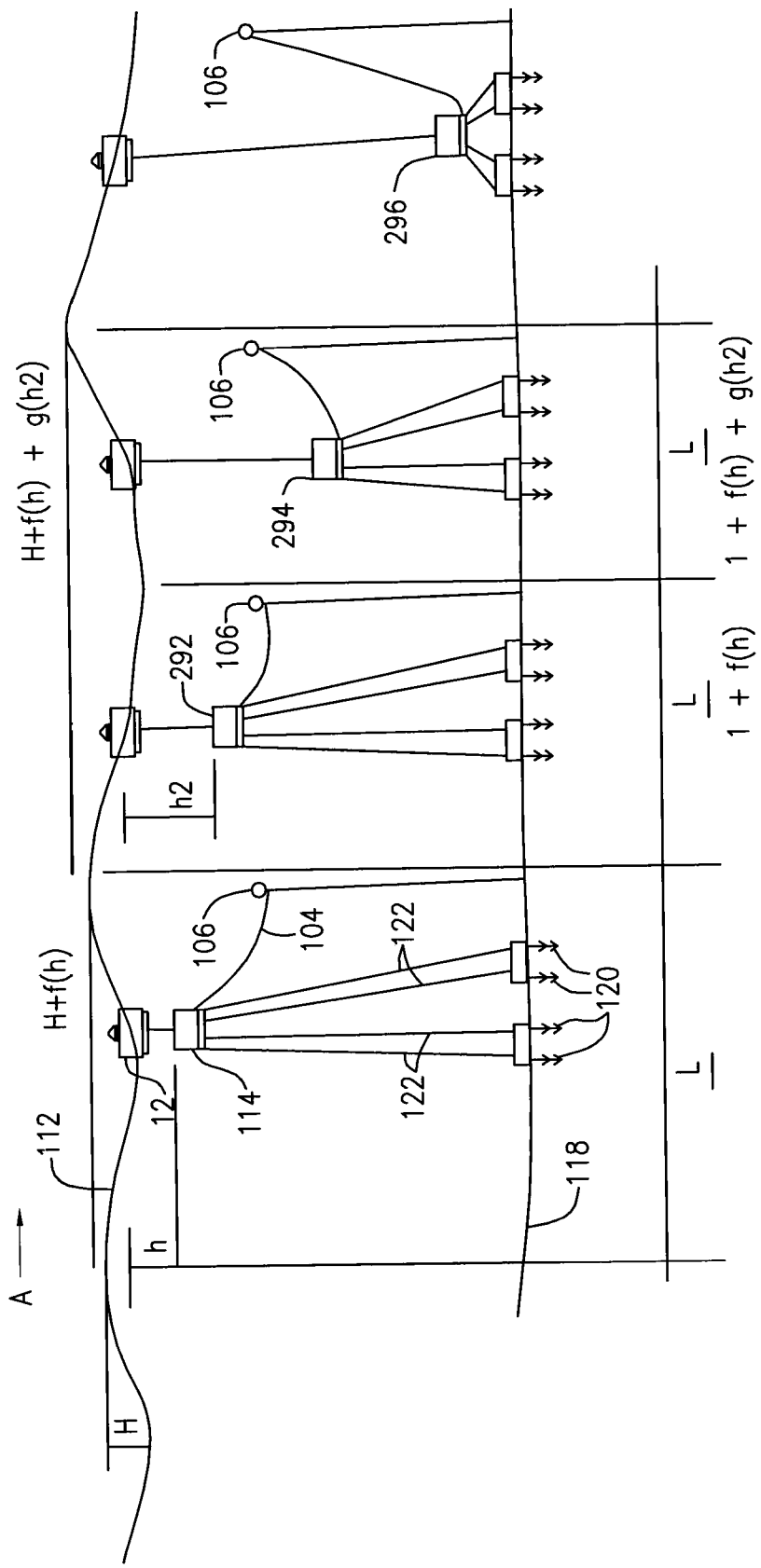
FIG. 11 is a schematic diagram of an array of wave energy harnessing devices shown in their deployed positions for performing wave shoaling.

Referring now to FIGS. 2 and 3, the compartments 20, 22 have cover plates 86 that are removable via the use of cover plate lift bars 88. Hydraulic lines 90 extending from the compartments 20, 22 are connected to anchor reels 92 and anchor winch motors/drag assemblies 94. The anchor reels 92 and anchor winch motors/drag assemblies 94 are positioned on the base plate 24, but they may be placed outside the base plate 24, depending on deployment particulars (e.g., an exemplarily deployment described hereinbelow and shown in FIG. 11). The anchor reels 92 and anchor winch motors/drag assemblies 94 are controlled by the anchor winch control valves 84 for adjusting the depth of the housing 14 below the water surface. Power cables 96 extending from the compartments 20, 22 are attached to a power conditioner 98 positioned on the base plate 24 for conditioning electrical energy into an electrical distribution grid (not shown). Hydraulic lines 100 extending from the compartments 20, 22 are attached to a power cable reel 102 positioned on the base plate 24 for spooling a power feeder cable 104 thereon. The power cable reel 102 may be replaced with a power cable connector that is replaceably connected to a power cable with a compliant mooring 106 (as shown in FIG. 11). A counterweight 108 is positioned on the base plate 24 to position the center of gravity of the device 10 in the center of the base plate 24. Tie-down bars 110 are positioned on the base plate 24 for securing the base plate 24 during transportation or maintenance, for example.

Figure 4:
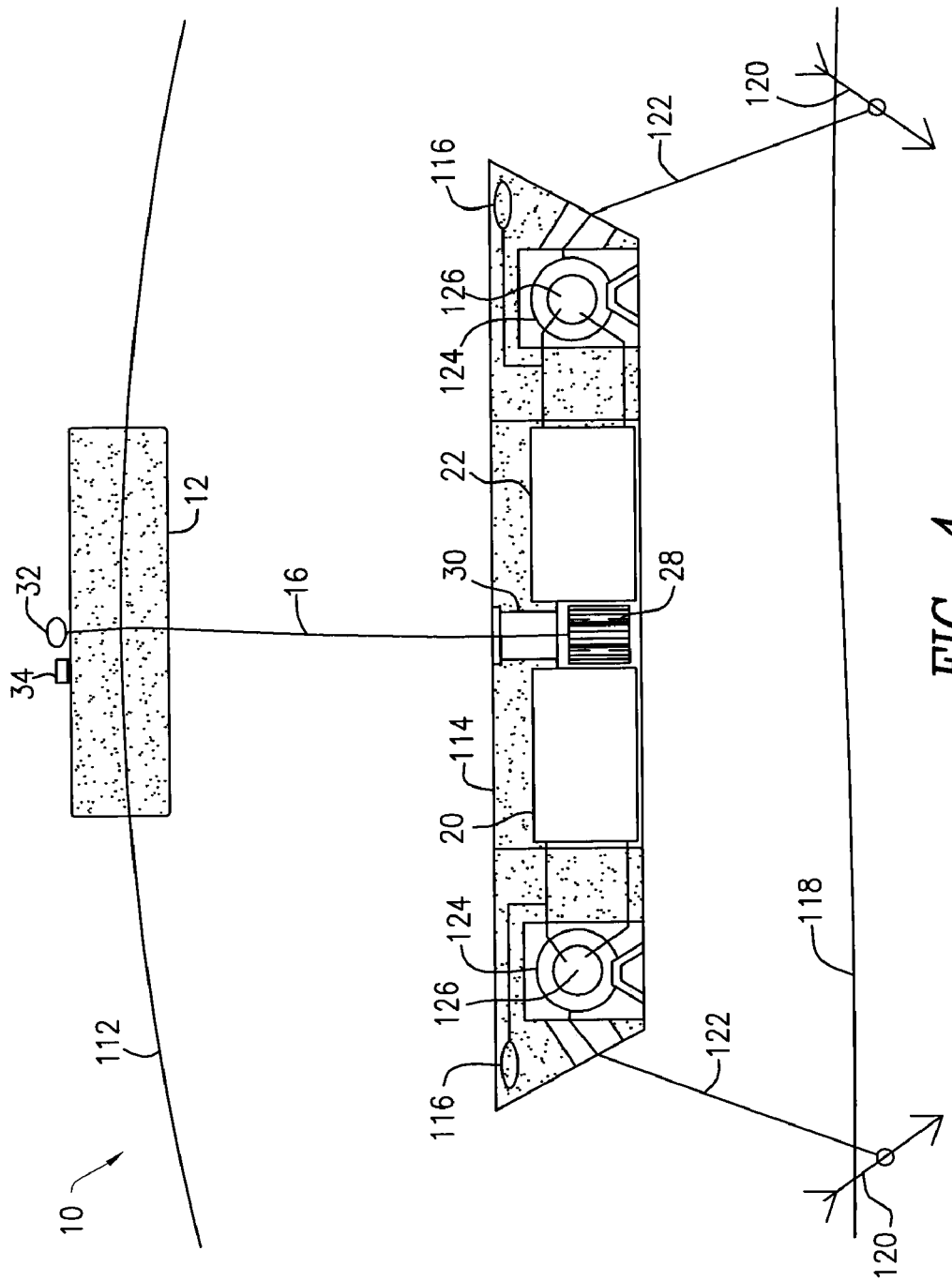
FIG. 4 is a schematic view of the wave energy harnessing device shown in FIG. 1, with the device being shown in its deployed position within a body of water.

FIG. 4 depicts the device 10 deployed in a body of water such as a sea. The float 12 is positioned on the water surface 112, and is tethered to the reel 28 by the line 16. The housing 14 is positioned in a buoyant housing 114. The buoyant housing 114 may be filled with foam, or other suitable material, and is sized and shaped to provide positive buoyancy to the buoyant housing 114 when submerged in the water. Depth sensors 116 mounted on the buoyant housing 114 are connected to the control logics 68 (not shown in FIG. 4), and provide measurements of the buoyant housing 114 depth below the water surface 112. The buoyant housing 114 is securely positioned in the body of water, relative to a sea floor 118, by a plurality of anchors 120. Conventional free-fall penetration anchors may be used at deployment locations where the sea floor is comprised of mud or silt. Any anchor type with sufficient load capacity to hold the buoyant housing 114 in place may be used. The anchors 120 are attached to the anchor reels 92 (not shown in FIG. 4) by anchor lines 122. The anchor reels 92 are controlled by the anchor winch motors/drag assemblies 94, which controls the spooling of the anchor lines 122 on the anchor reels 92, as well as the depth of the buoyant housing 114 below the water surface 112.

Figure 5:
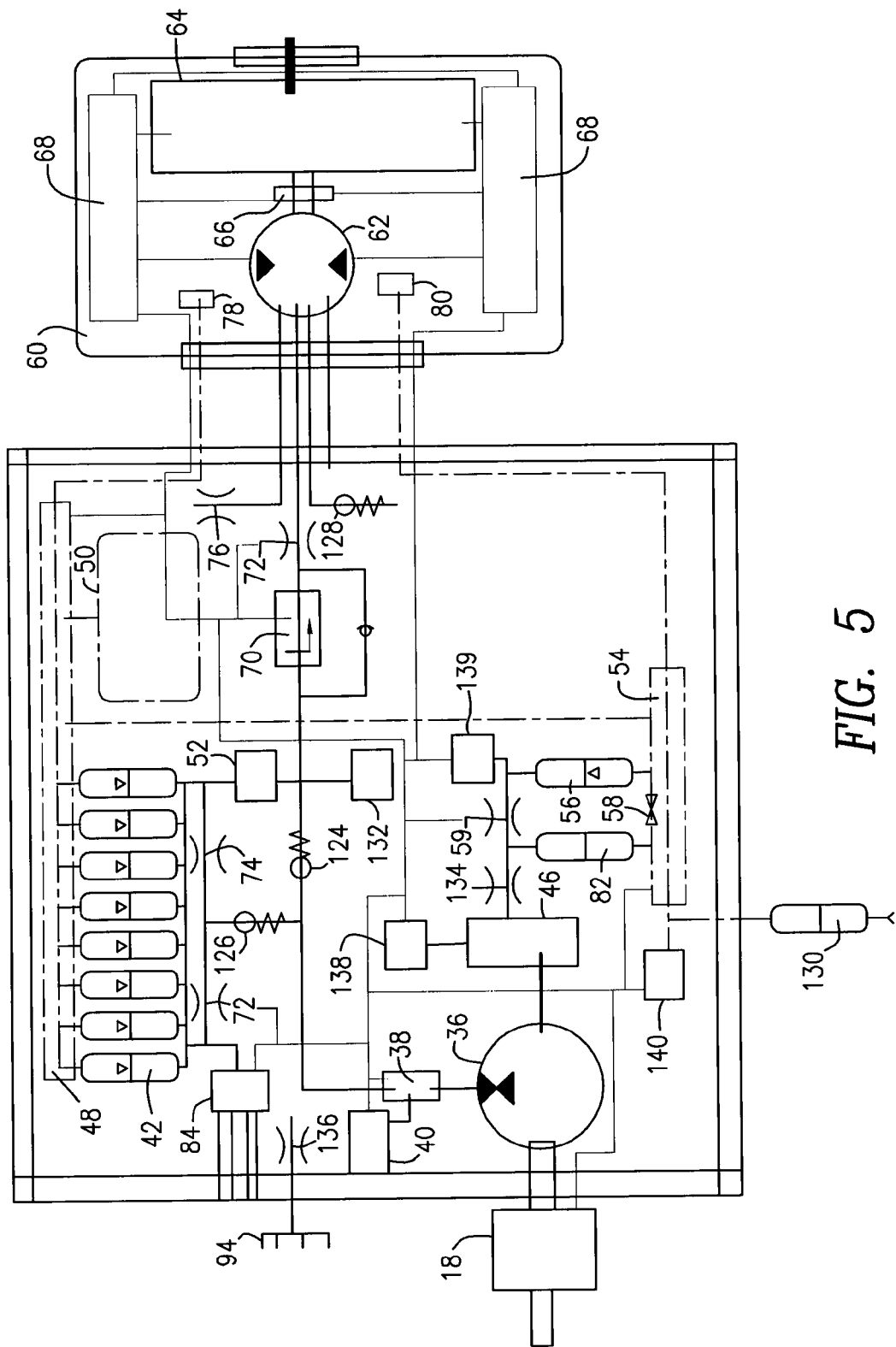
FIG. 5 is a schematic circuit diagram of hydraulic, pneumatic, and control circuit elements of the wave the energy harnessing device shown in FIGS. 1-4.

FIG. 5 depicts hydraulic, pneumatic, and control circuit layouts for the compartment 22. The compartment 22 is essentially identical in construction and operation to the compartment 20. In such circumstances, the construction and operation of the compartment 22 only will be discussed in detail hereinbelow. With reference to FIG. 5, it is noted that the solid black lines denote tubing or piping that conveys high pressure or low pressure fluid (i.e., oil) between elements. The dashed lines denote tubes, pipes or manifolds that convey high or low pressure gas (e.g., nitrogen) between elements, and the thin black lines denote control leads or wires between the control logic 68 and elements. The following elements shown in FIG. 5, which have not been identified above are identified as follows: a check valve accumulator in 124, a check valve accumulator out 126, a hydraulic motor outlet check valve 128, an ambient pressure accumulator 130, a relief valve 132, a pre-charge chamber intake orifice 134, an anchor winch fluid return valve 136, pressure transducers (i.e., located on the pump-motor pre-charge chambers 46) 138, and pressure transducers 139, 140.

Power Generation

With reference to FIG. 4, the device 10 extracts wave energy and produces electricity. The control logics 68 receive and process signals from the depth sensors 116 mounted on the buoyant housing 114 and motion sensors 34 mounted on the float 12. The control logics 68 send data to the communications package 32 which transmits the data to computers via satellites, cell phones, radios, or other signal processing devices. The current wave conditions are reported to the control logics 68 in the buoyant housing 114 by the motion sensor 34 on the float 12, elements in the buoyant housing 114, and/or signals from a remote source. The control logics 68 use that information to determine the flow rate and direction through all the hydraulic valves on the device 10. More particularly, as a wave passes under the float 12, wave energy extraction is accomplished by the float 12 rising with the passing wave. The rising float 12 pulls the line 16 upwards, which unspools the line 16 off of the reel 28. The unspooling of the line 16 off of the reel 28 exerts torque on the axel 26 which exerts torque on the impellers of the pump-motors 36. The pump-motors 36 then operate in the pump mode, with the impellers pumping fluid to the high-pressure accumulator banks 42. Since there is a net gain in pressure in the high-pressure accumulator banks 42 after each wave cycle, wave energy is therefore being stored as compressed gas. As the pressure continues to increase, the energy available to operate the generator drive motors 62 increases. The electric generators 64 are, in turn, driven by the hydraulic transmissions 66 to produce electricity. The amount of energy that can be stored in the device 10 is directly proportional to the volume and pressure capacity of the high pressure accumulator banks 42. Given sufficient volume and pressure capacity, the device 10 can produce electricity for long periods of time even if there are no waves acting on the system. Ideally, the high-pressure accumulator banks 42 are maintained at nearly full capacity in normal operations where input from the pump-motors 36 is matched by the energy used in the electric generators 64. This allows the device 10 to provide electricity during periods of flat or calm seas. This is accomplished by using the energy stored in the high-pressure accumulator banks 42 to operate the generator drive motor 62. The control logics 68 are used to regulate this function. The control logics 68 monitor sensors in the high-pressure accumulator banks 42 (e.g., pressure transducers 52) to determine if sufficient energy is stored as compressed gas to operate the generators 64. If sufficient energy is available, the control logics 68 allow pressure to flow from the high-pressure accumulator banks 42 through the sequence valves 70 and flow control valves 72 which draw fluid from the oil reservoirs through the drive orifice 74. The fluid flow turns the generator drive motors 62, hydraulic transmissions 66 and generators 64. The generators 64 then transmit electricity through the power cables 96 to the power conditioner 98.

As the float 12 falls with the passing wave, the pressure transducers 40 attached to the pump-motor control valves 38 transmit decreasing fluid pressure measurements to the control logics 68, which direct the pump-motor control valves 38 to terminate fluid flow to the high-pressure accumulator banks 42 and directs low pressure fluid, stored in the supply pre-charge accumulators 82, to the pump-motors 36, thereby converting the pump-motors 36 to the motor mode. In this mode, the line 16 is rewound onto the reel 28 as the float 12 moves from the crest of the wave to the trough of a wave.

Figure 6:
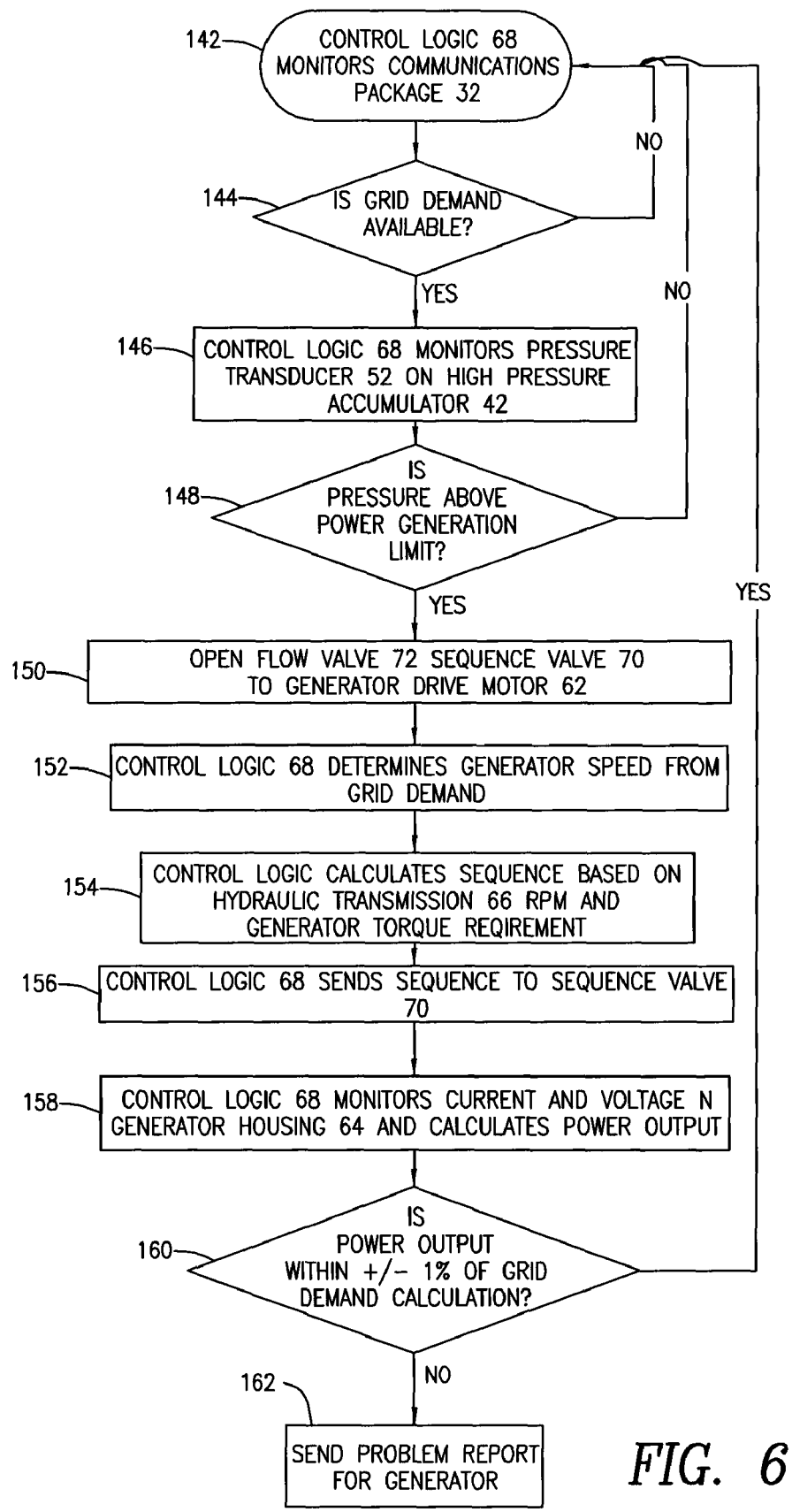
FIG. 6 is a schematic flow chart of the steps involved in connection with power generation functionality of the wave energy harnessing device shown in FIGS. 1-4.

FIG. 6 illustrates the steps involved with the generation of electricity by the device 10. More particularly, the steps involved in the generation of electricity for use on a power grid (not shown) are defined by blocks 142 through 162.

Load Control for Pump-Motor

Figure 7:
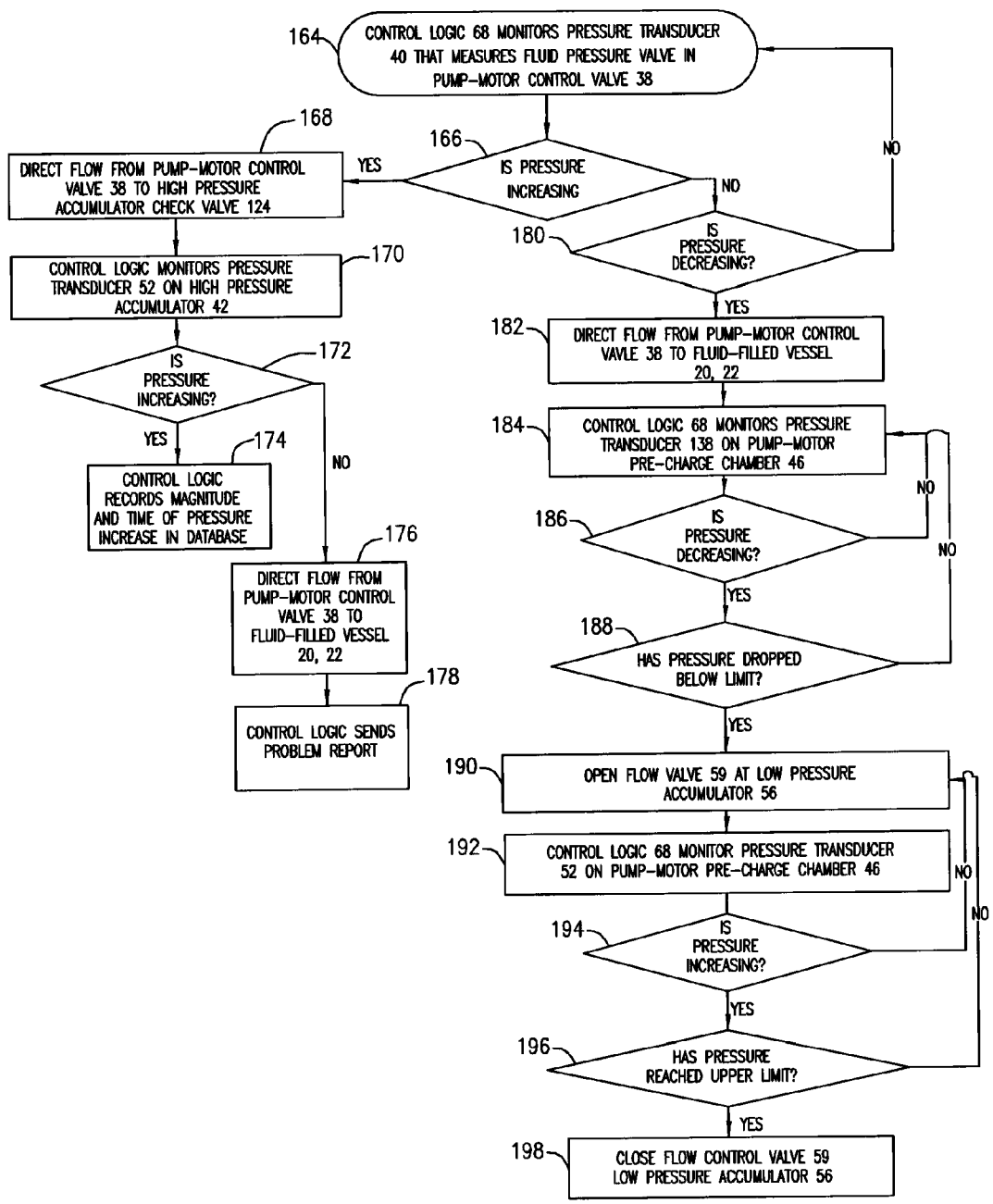
FIG. 7 is a schematic flow chart of the steps involved in connection with load control functionality of the wave energy harnessing device shown in FIGS. 1-4.

FIG. 7 depicts the steps for controlling the load (i.e., the tension on the line 16) for the pump-motors 36. More particularly, the blocks 164 through 198 describe the load control processes that contributes to the optimization of the energy extracted from the waves. The load control of the pump-motors 36 are orchestrated by the control logics 68 based numerous parameters, including the functioning of the high-pressure accumulator bank components 42, 48, 50, and 52 and the low-pressure accumulator bank components 54, 56, 58, 59, 82, 134, 139, and 140. The load control processes are focused on achieving the maximum charging rate for the high-pressure accumulator banks 42 under the current wave conditions. This is achieved by continuously adjusting the tension (i.e., the load) on the line 16 that is applied to the pump-motor 36.

Continuous Phase Control

With reference to FIG. 4, the device 10 achieves maximum energy extraction efficiency when the natural response frequency of the float 12 matches the frequency of the incident waves. This is achieved by a process known as continuous phase control, and is enabled by using a hydraulic system with load sensing capabilities. Continuous phase control enables a wave energy conversion system to optimize wave energy harnessing efficiency. To maximize wave energy harnessing efficiency, the float 12 motion must be in resonance with the sea waves. The device 10 accomplishes continuous phase control by sensing the loads (i.e., the tensions) on the reel 28 and the anchor reels 92, and adjusting the tensions on these reels to tune the device 10 for maximum energy extraction from the sea waves. For instance, load sensing is used for the load control of the pump-motor 36 (i.e., as discussed in the aforementioned section entitled Load Control For Pump-Motor) by sensing the fluid pressure downstream of the pre-charge chamber intake orifice 134 and adjusting the pump-motor 36 flow to maintain a constant pressure drop (and therefore flow) across the drive orifice 74 and the pre-charge chamber intake orifice 134. The pre-charge chamber intake orifice 134 may comprise directional control valves with proportional flow characteristics, needle valves or fixed orifices.

Continuous phase control for the device 10 is a repetitive, iterative process which can be described in one wave cycle. The following description illustrates the device 10 utilizing continuous phase control where the float 12, attached to the reel 28, starts in the trough of a wave, is lifted by the approaching wave crest, and returns to the trough as the wave crest passes.

As the wave crest approaches, the float 12 is lifted which increases the tension in the line 16 to the anchor reel 92. Lift is also applied to the buoyant housing 114 by water particle motion. The control logics 68 use outputs from motion the sensors 34 mounted on the float 12 and the depth sensors 116 mounted on the buoyant housing 114 to determine the loads (i.e., tensions) required to be applied on the reel 28 and the anchor lines 122 in order for the float 12 to achieve resonance with the waves. As the float 12 rises, the line 16 is paid out (i.e., unspooled) from the reel 28 which applies torque to the axel 26 and, in turn, to the impellers in the pump-motors 36. As the impellers rotate, the pump-motor 36 acts as a pump, drawing fluid from the oil reservoir and forcing the fluid into the pump-motor flow control valve 38. The control logics 68 use the pump-motor control valve 38 to direct fluid into the high-pressure accumulator bank 42 at a specific rate, while simultaneously controlling the tensions on the anchor lines 122 using the anchor winch control valves 84. The control logics 68 uses a pre-deployment look-up table to estimate the line tensions required for maximum energy extraction, record actual tensions into a reference table, compare the actual tension to the table, and dynamically update the tensions used based on pressure reading from the high-pressure accumulator bank 42.

As the wave crest passes under the float 12, the control logics 68 sense a reduced load in the pump-motor flow control valve 38 and switch the fluid flow direction, which causes the pump-motor 36 to act as a motor rewinding the line 16 attached to the float 12. The control logics 68 continue to manage the tensions on the anchor lines 122 and fluid flow throughout the device 10. When the float 12 returns to the trough of the wave, the cycle repeats. Since the tension in the line 16 is greater as the float 12 moves from the trough to the crest than is required to rewind the reel 28, there is be a net gain in the pressure in the high-pressure accumulator banks 42 during each wave cycle.

Figure 8:
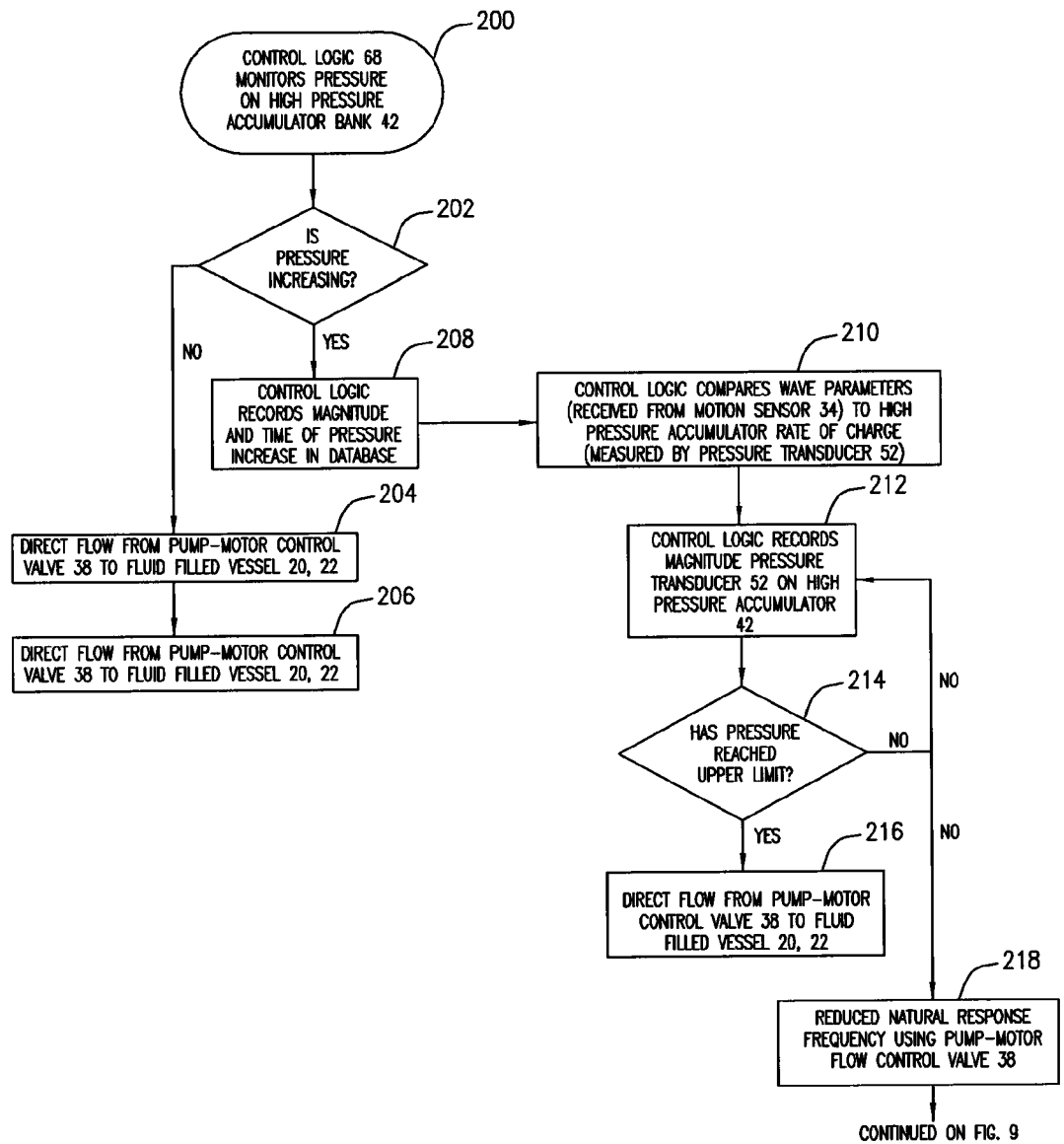
FIGS. 8-10 are schematic flow charts of the steps involved in connection with continuous phase control functionality of the wave energy harnessing device shown in FIGS. 1-4.
Figure 9:
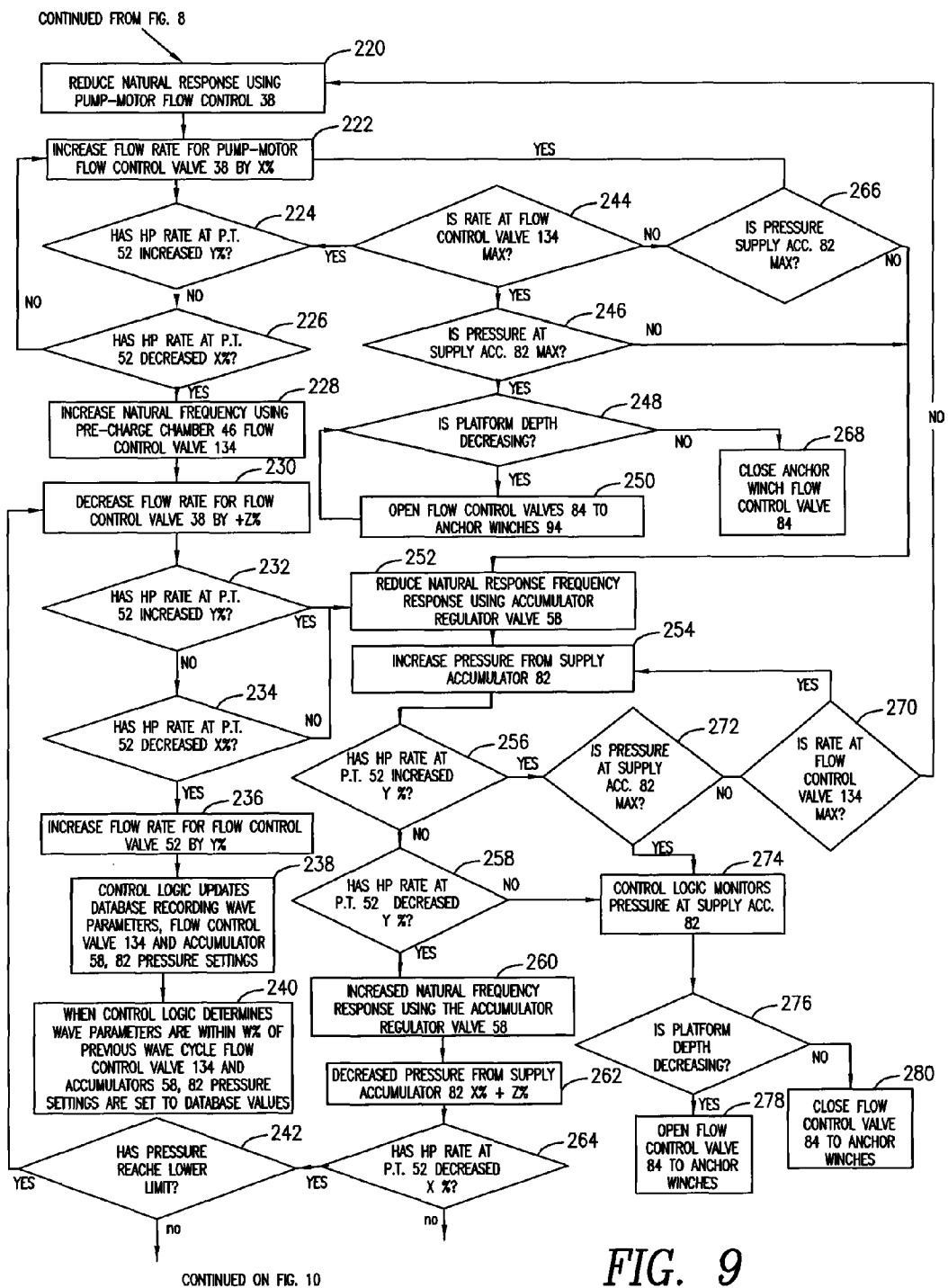
Figure 10:
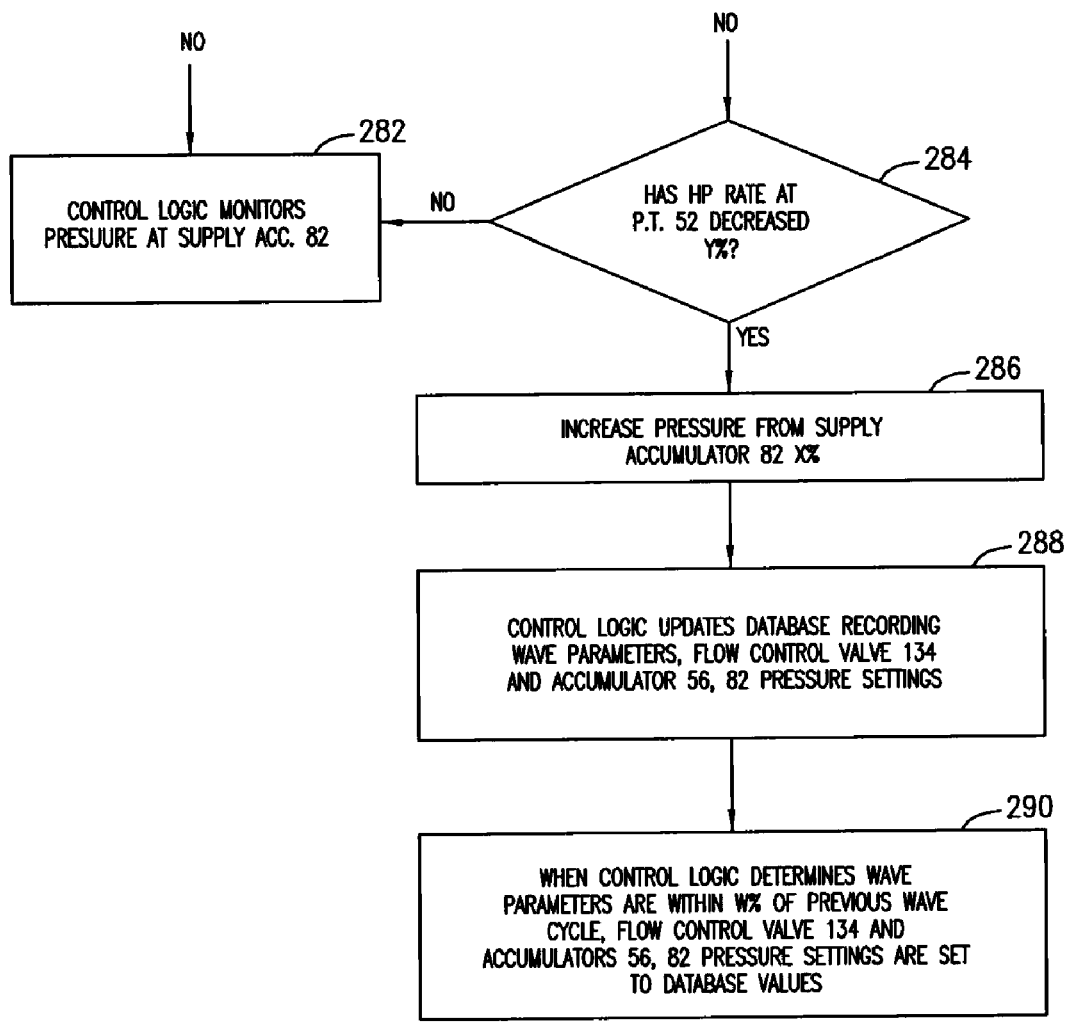

Referring to FIG. 8-10, the steps involved with the continuous phase control are depicted in detail in blocks 200 through 290. The blocks define the steps taken, and the apparatus involved in achieving maximum energy extraction efficiency when the natural response frequency of the float 12 matches the frequency of the incident waves.

Wave Shoaling

FIG. 11 illustrates the wave shoaling and storm avoidance features is enabled by the variable depth buoyant housing 114 capabilities of the device 10. More particularly, a multiplicity of the device 10 are deployed in a body of water, and are arranged for the purpose of shoaling waves for optimizing the output of energy extracted from the waves. The direction of wave propagation is indicated by arrow A. Energy density in waves increases exponentially with wave height. If incoming waves have long periods (i.e. more than five seconds) and small wave heights (i.e., less than one meter), the buoyant housings 114 can be raised near the surface 112 of the water to cause shoaling to increase the wave height passing over the buoyant housings 114 in the direction of wave propagation. The operation of the devices 10 depends on the environment where they are to be used. For example, when the devices 10 are situated in an ocean having large annualized average wave heights of two meters or more, and frequent occurrences of extreme waves of ten meters or more, the depth of the anchor systems should exceed approximately fifty meters. It is considered prudent to set anchors in approximately one hundred meters of water depth and to build the water-tight buoyant housings 114 to operate in excess of one hundred meters of water depth in extreme wave climates such as those encountered in the Southern Ocean. Wave climates with annualized wave height averages of less than two meters will reduce anchor depth requirements and increase the benefits of the shoaling feature. The following parameters are used in describing the wave shoaling energy extraction optimization functionality:

H=incident wave height
h=depth of the buoyant housing
f(h)=function of buoyant housing depth on incident wave height
g(h2)=function of buoyant housing depth on wave height after one row of shoaling devices
L=wave length As the train of waves approach from the direction indicated by the arrow A, the buoyant housing 114 is raised near the surface (h) to cause a shoaling effect which increases the wave height (H+f(h)) and the energy density in the wave field. More particularly, as the crest of a wave passes under the float 12, the wave frequency and height are transmitted by motion sensors 34 on the float 12 to the control logics 68 from the communications package 32 over the communications wire (not shown). The control logics 68 refer to a database to determine the optimal shoaling depth for the buoyant housing 114 for the wave conditions contained in the wave train. The control logics 68 then send commands to the anchor winch control valves 84 so as to direct the anchor winch motor/drag assembly 126 to spool the anchor lines 122 on the anchor reels 124 to raise or lower the buoyant housing 114 and set the anchor reel motor/drag assembly 126 drag tensions on the anchor lines 122. As one wave passes and another wave approaches, the wave data is updated and the depth of the buoyant housing is adjusted, if necessary, based on the control logics 68 database.

Figure 12:
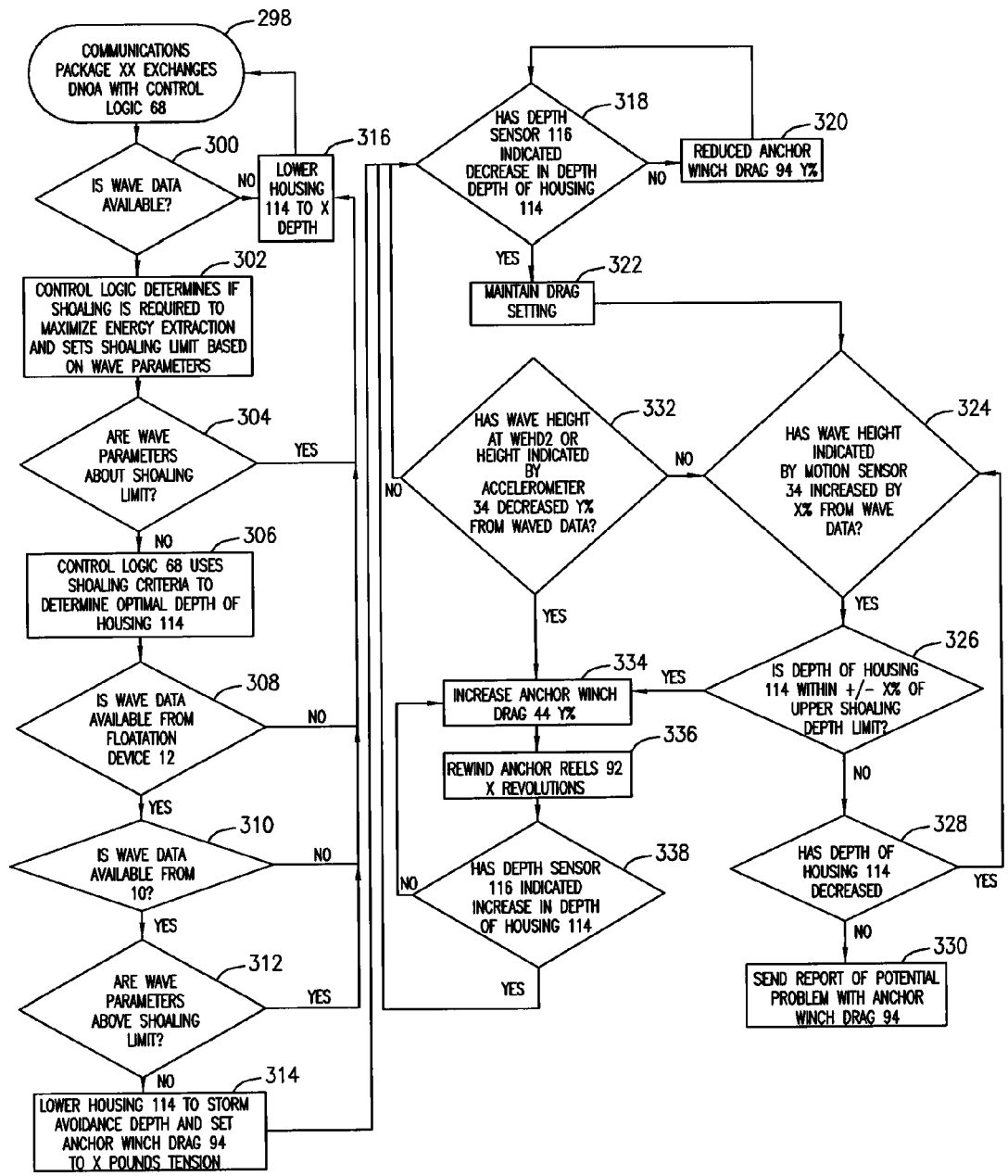
FIG. 12 is a schematic flow chart of the steps involved in connection with the wave shoaling functionality of the wave energy harnessing devices shown in FIG. 11.

As the waves continue to propagate in the direction of the arrow A, a second buoyant housing 292 is lowered slightly deeper (i.e., to a depth h2 below the buoyant housing 114). This continues to increase the wave height and energy density in the wave field (H+f(h)+g(h2)). The buoyant housing 292 allows shoaling to continue without causing the waves to break. After optimal shoaling is achieved, buoyant housings 294 and 296 are lowered near the sea floor to reduce loading on the anchor lines. Optimal shoaling for wave energy conversion is achieved when wave steepness is increased to a maximum without causing the waves to break. Breaking waves lose a large percentage of their energy to turbulent mixing, which reduces the energy available to the devices in the direction of wave propagation. In this manner, should the devices 10 be used for shoreline protection, they could be used to shoal waves to a breaking point to reduce the energy reaching shore. Referring to FIG. 12, the steps and apparatus involved with wave shoaling energy extraction optimization processes are described in greater detail in blocks 298 through 338.

Storm Avoidance

Figure 13:
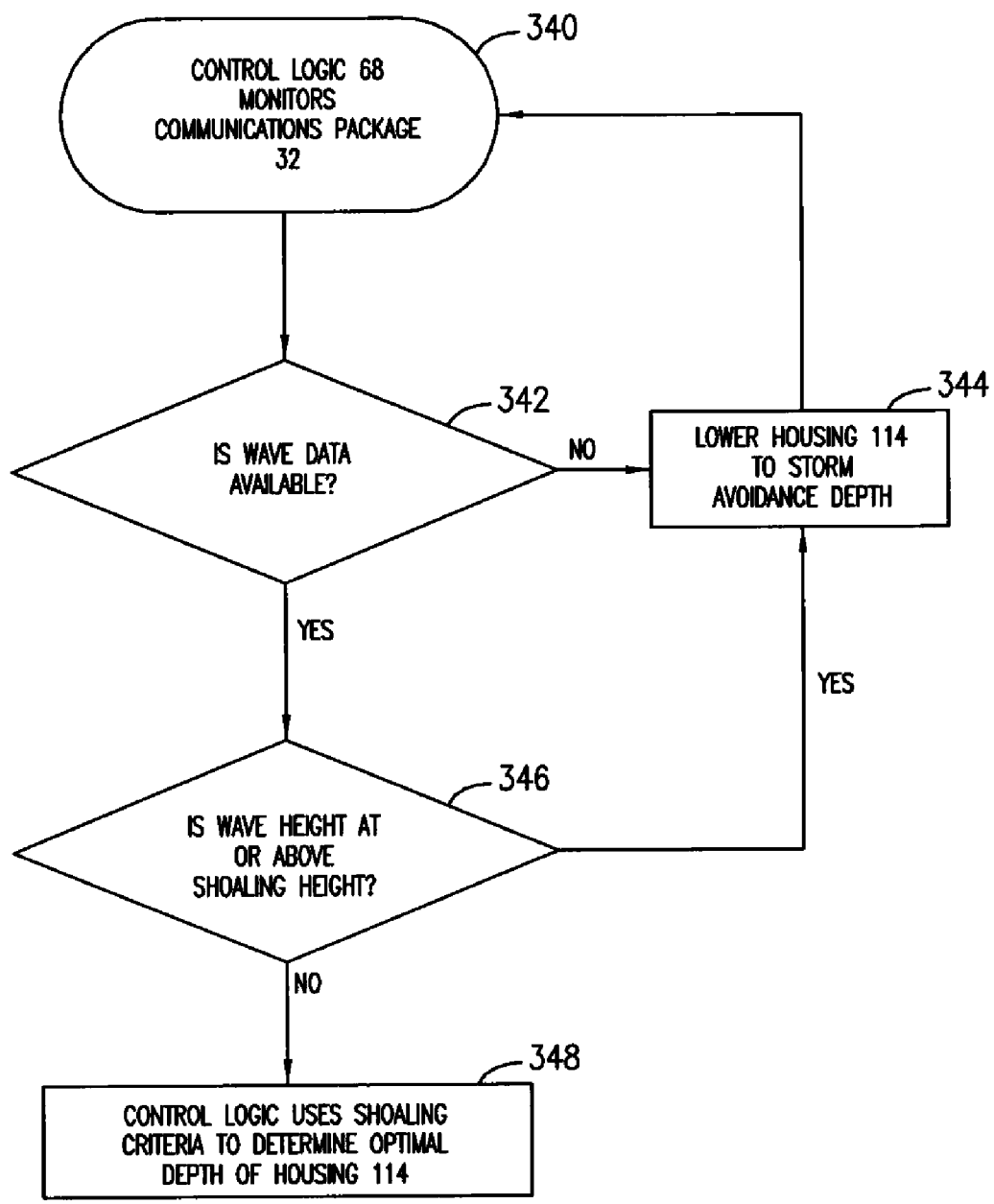
FIG. 13 is a schematic flow chart of the steps involved with the storm avoidance functionality of the wave energy harnessing devices shown in FIG. 11.

Referring again to FIG. 11, during storm events and periods of large waves, shoaling may not be required to meet the demand for electricity and all the housing can be lowered near the sea floor to minimize loading on the anchor lines 122. Data indicating impending danger from approaching storm fronts or tsunamis may be received by the communications packages and conveyed by the communications wire to the control logics 68. The control logics 68, acting on the data, in turn activates the anchor winch control valves 84 to operate the anchor winch motor/drag assemblies 94 so as to rotate the anchor reels 92 to reel-in the anchor lines 122 and, thus, position the buoyant housing 114 near the sea floor 118. Referring to FIG. 13, the steps and apparatus involved with storm avoidance processes are described in greater detail in blocks 340 through 348.

It should be noted that the present invention can have numerous modifications and variations. For instance, the present invention provides optimizing functionality for maximizing the amount of energy that is extracted from the waves using a flotation device. It is understood that the optimizing functionality may be applied to any hydrokinetic device that harnesses and converts wave energy (e.g., systems using sea walls, track and rail systems, pump systems, capture basins, piston driven systems, oscillating water columns, flapper systems, linear magnet systems, wave swings, etc.), and is not limited wave energy harnessing devices that employ flotation devices. Also, more than one float/reel/pump-motor/accumulator arrangements (i.e., as described in the aforesaid discussions) may be incorporated in any one of the wave energy harnessing device 10. Further, the pump-motor 36 located in compartment 20 can be adapted to function only in the pump mode, while the pump-motor 36 located in compartment 22 can be adapted to function only in the motor mode, or vice-versa, with fluid or stored energy being transferred between the compartments 20, 22. Wave energy harnessing device farms or arrays may be employed comprising any number of devices having various spacing and array configurations (i.e., parallel, offset, etc.). Hydraulic controls are preferred for use on the device, but tension on the reel and anchor winches can be controlled by other means such as mechanical drag or electromotive force to regulate the tension on the line and anchor lines. In the case of mechanical drag, the control logics 68 may send signals to a clutch assembly capable of varying the tension required for the lines to spool on or off the reels 28.

It will be understood that the embodiment described herein is merely exemplary and that a person skilled in the art may make many variations and modifications without departing from the spirit and scope of the invention. All such variations and modifications, including those discussed above, are intended to be included within the scope of the invention as defined in the appended claims.

I claim:

1. An apparatus for converting oceanic wave energy into electric energy, comprising:
    a housing having an energy receiving element, an energy storing element and an energy dispersing element, said housing being submersible in a body of water, the body of water having a surface and a floor;
    at least one depth adjustment element for adjusting the depth of said housing in the body of water, said at least one depth adjustment element having a first end connected to said housing and a second end opposite said first end that is anchored to the floor of the body of water;
    a controller in communication with said energy receiving, storing and dispersing elements and said at least one depth adjustment element, wherein said controller controls the operation of said energy receiving, storing and dispersing elements and said at least one depth adjustment element;
    at least one motion sensor in communication with said controller, said at least one motion sensor being able to measure waves in the surface of the body of water and transmit wave measurement signals to said controller;
    at least one depth sensor in communication with said controller, said at least one depth sensor being able to measure the location of said housing in relation to the surface of the body of water and transmit depth measurement signals to said controller;
    wherein said controller is capable of receiving said wave measurement and depth measurement signals from said at least one motion sensor and said at least one depth sensor and automatically directing said energy receiving, storing and dispersing elements and said at least one depth adjustment element to position said housing to a particular location within the body of water for the purpose of shoaling the waves in the surface of the body of water and providing continuous phase control and load control of said energy receiving, storing and dispersing elements.

2. The apparatus according to claim 1, wherein said controller is attached to said housing.

3. The apparatus according to claim 2, wherein said controller includes at least one control logic module.

4. The apparatus according to claim 1, wherein said energy receiving element includes a reel, a line attached to said reel, and a floatation element attached to said line.

5. The apparatus according to claim 1, wherein said at least one depth adjustment element includes a plurality of depth adjustment elements.

* * * * *